United States Patent
Zhou et al.

(10) Patent No.: US 9,720,155 B2
(45) Date of Patent: Aug. 1, 2017

(54) MULTILAYERED ARTICLES WITH LOW OPTICAL RETARDATION

(71) Applicant: SABIC Global Technologies B.V., Bergen op Zoom (NL)

(72) Inventors: Jian Zhou, Mt. Vernon, IN (US); Adel Bastawros, Mt. Vernon, IN (US); Wei Feng, Shanghai (CN); Zhi Wang, Shanghai (CN); Yuan Zhou, Shanghai (CN)

(73) Assignee: SABIC GLOBAL TECHNOLOGIES, Bergen Op Zoom (NL)

( * ) Notice: Subject to any disclaimer, the term of this patent is extended or adjusted under 35 U.S.C. 154(b) by 0 days.

(21) Appl. No.: 15/124,882

(22) PCT Filed: May 1, 2015

(86) PCT No.: PCT/US2015/028868
§ 371 (c)(1),
(2) Date: Sep. 9, 2016

(87) PCT Pub. No.: WO2015/168610
PCT Pub. Date: Nov. 5, 2015

(65) Prior Publication Data
US 2017/0045655 A1    Feb. 16, 2017

Related U.S. Application Data

(60) Provisional application No. 61/987,918, filed on May 2, 2014.

(51) Int. Cl.
*G02B 5/02* (2006.01)
*G02B 5/30* (2006.01)
(Continued)

(52) U.S. Cl.
CPC ............ *G02B 5/305* (2013.01); *B29C 47/065* (2013.01); *B29C 47/8845* (2013.01);
(Continued)

(58) Field of Classification Search
None
See application file for complete search history.

(56) References Cited

U.S. PATENT DOCUMENTS 6,087,007 A   7/2000 Fujii et al.
6,638,583 B1  10/2003 Sharp et al.
(Continued)

FOREIGN PATENT DOCUMENTS

EP    0514223 A1   11/1992
EP    0914926 A2    5/1999
(Continued)

OTHER PUBLICATIONS

A.S. Redner, "Photoelastic measurements by means of computer-assisted spectral contents analysis," Expt. Mech., 25, 148-153 (1985).
(Continued)

*Primary Examiner* — Derek S Chapel
(74) *Attorney, Agent, or Firm* — Cantor Colburn LLP

(57) ABSTRACT

A coextruded multilayered thermoplastic article including: a first layer with a first surface texture, wherein the first layer comprises a first transparent thermoplastic polymer having a first stress optical coefficient ($C_{m1}$) measured at 20° C. above the glass transition temperature of the first polymer; a second layer located comprising a second transparent thermoplastic polymer having a second stress optical coefficient ($C_{m2}$) measured at 20° C. above the glass transition temperature of the second matrix; wherein a relation between the first stress optical coefficient and the second stress optical coefficient is $C_{m2} > 4(C_{m1})$ (Formula A) wherein the
(Continued)

thickness of the first layer measured from the highest peaks of the first surface texture to the second side of the first layer is greater than 1.5 times Rz of the first surface texture but less than or equal to 75% of the total thickness of the article.

20 Claims, 6 Drawing Sheets

(51) Int. Cl.
- B32B 27/08 (2006.01)
- B32B 27/30 (2006.01)
- B32B 27/32 (2006.01)
- B32B 27/36 (2006.01)
- B29C 47/06 (2006.01)
- B29C 47/88 (2006.01)
- B29C 59/02 (2006.01)
- B29D 11/00 (2006.01)
- G02F 1/1335 (2006.01)
- B29L 9/00 (2006.01)
- B29L 11/00 (2006.01)

(52) U.S. Cl.
CPC ...... *B29C 59/026* (2013.01); *B29D 11/00644* (2013.01); *B32B 27/08* (2013.01); *B32B 27/302* (2013.01); *B32B 27/308* (2013.01); *B32B 27/325* (2013.01); *B32B 27/36* (2013.01); *B32B 27/365* (2013.01); *G02B 5/0221* (2013.01); *G02F 1/133504* (2013.01); *G02F 1/133536* (2013.01); *B29K 2995/0026* (2013.01); *B29L 2009/00* (2013.01); *B29L 2011/0066* (2013.01); *B32B 2307/408* (2013.01); *B32B 2307/412* (2013.01); *B32B 2307/42* (2013.01); *B32B 2307/538* (2013.01); *B32B 2307/558* (2013.01); *B32B 2457/202* (2013.01); *B32B 2551/00* (2013.01); *G02F 2001/133545* (2013.01)

(56) References Cited

U.S. PATENT DOCUMENTS

| | | | |
|---|---|---|---|
| 6,682,805 | B1 | 1/2004 | Lilly |
| 6,773,649 | B2 | 8/2004 | Bourne et al. |
| 6,808,780 | B2 | 10/2004 | Laney et al. |
| 6,913,714 | B2 | 7/2005 | Liu et al. |
| 6,964,795 | B2 | 11/2005 | Elman et al. |
| 7,341,784 | B2 | 3/2008 | Yeung et al. |
| 8,124,198 | B2 | 2/2012 | Kashima et al. |
| 9,097,858 | B2 | 8/2015 | Merrill |
| 2003/0123149 | A1 | 7/2003 | Xi et al. |
| 2004/0099973 | A1 | 5/2004 | Liu et al. |
| 2006/0093809 | A1 | 5/2006 | Hebrink et al. |
| 2007/0285779 | A1* | 12/2007 | Walker ............ G02B 5/305 359/487.05 |
| 2008/0020186 | A1 | 1/2008 | Hebrink et al. |
| 2009/0115943 | A1 | 5/2009 | Gaides |
| 2010/0075069 | A1* | 3/2010 | Laney ............ B32B 27/36 428/1.6 |
| 2010/0168409 | A1 | 7/2010 | Fujita |
| 2012/0195050 | A1 | 8/2012 | Pokorny |
| 2012/0268964 | A1 | 10/2012 | Bastawros et al. |
| 2014/0199536 | A1 | 7/2014 | Kappacher et al. |

FOREIGN PATENT DOCUMENTS

| | | | |
|---|---|---|---|
| EP | 0916474 | A1 | 5/1999 |
| EP | 0936227 | A1 | 8/1999 |
| EP | 2583825 | A1 | 4/2013 |
| EP | 2634208 | A1 | 9/2013 |
| JP | H0776055 | A | 3/1995 |
| JP | H08164581 | A | 6/1996 |
| JP | 2003082131 | A | 3/2003 |
| JP | 2003167121 | A | 6/2003 |
| JP | 2005089634 | A | 4/2005 |
| JP | 2012011556 | A | 1/2012 |
| WO | 8100011 | A1 | 1/1981 |

OTHER PUBLICATIONS

English Abstract of JP2003082131(A); Date of Publication: Mar. 19, 2003; 2 Pages.

International Search Report for International Application No. PCT/US2015/028868; International Filing Date: May 1, 2015; Date of Mailing: Jul. 14, 2015; 5 Pages.

Machine Translation of JP2003167121(A); Date of Publication: Jun. 13, 2003; 28 Pages.

Machine Translation of JP2005089634(A); Date of Publication: Apr. 7, 2005; 18 Pages.

Machine Translation of JP2012011556; Date of Publication: Jan. 19, 2012; 11 Pages.

Machine Translation of JPH0776055(A); Date of Publication Mar. 20, 1995; 10 Pages.

Machine Translation of JPH08164581(A); Date of Publication: Jun. 25, 1995; 12 Pages.

Min et al. "Dynamic Measurement of Stress Optical Behavior of Three Amorphous Polymers," Korea-Australia Rheology Journal vol. 24, No. 1, Mar. 2012 pp. 73-79.

Wimberger-Friedl "The peculiar rheo-optical behavior of bisphenol-A-polycarbonate and polymethylmethacrylate", Rheol Acta 30:329-340 (1991).

Written Opinion of the International Searching Authority for International Application No. PCT/US2015/028868; International Filing Date: May 1, 2015; Date of Mailing: Jul. 14, 2015; 6 Pages.

\* cited by examiner

MULTILAYERED ARTICLES WITH LOW OPTICAL RETARDATION

CROSS REFERENCE TO RELATED APPLICATIONS

This application is a 371 of International Application No. PCT/US2015/028868, filed May 1, 2015, which claims priority to U.S. Application Ser. No. 61/987,918, filed May 2, 2014 which are incorporated herein by reference in their entirety.

BACKGROUND

This disclosure relates to multilayered articles with low optical retardation, and in particular to multilayered article compositions, methods of manufacture, and uses thereof.

Optical sheets/films used for liquid crystal display applications can be made with a variety of transparent thermoplastic materials. The desired properties of the thermoplastic materials for these applications include high transparency, good color, high clarity, high glass transition temperature, toughness, ductility, dimension stability, chemical resistance, melt processability, etc. Polycarbonate satisfies many of the above requirements. However, optical sheets/film or disks made from polycarbonate (i.e. Bisphenol-A (BPA) polycarbonate homopolymer (BPA-PC)) possess relatively high optical retardation if they are formed using a melt extrusion or a molding process that involves cooling of the polycarbonate resin from melt to solid under pressure or stress. Examples of such extrusion or molding processes include calendering sheet/film extrusion, profile extrusion, embossing, injection molding and compression molding process, etc., which are used for the purpose of forming the shape and/or the surface finish or texture of the articles being molded.

High optical retardation level of an optical sheet can be associated with high non-uniformity in distribution of optical retardation across a large area due to a non-uniform pressure applied to the optical sheets during their melt processing step. As a result, the non-uniformly distributed optical retardation in the sheets causes visually undesirable color band issues ("Rainbow Mura" or "Rainbow appearance") for the applications related to liquid-crystal displays (LCD). Optical films with light management textures (such as micro-lens, prismatic, or engineered random textures) and non-uniformly distributed optical retardation are not ideal for use in a top film layer in the display film stack used in Back Light Modules (BLM) of LCD displays because of the "Rainbow Mura" issue. In addition, for reflective polarizer sheets used in some LCD displays, a high optical retardation level in the top light diffusing layer can cause light depolarization, hence leading to a loss of brightness enhancement effect of the reflective polarizer sheet.

Previous attempts to make an optical thermoplastic sheet, film or disk with low retardation include the following approaches: 1) using a material with inherently low birefrigence as a substitute for the material with inherently high birefrigence; 2) reducing the residual mechanical stress in the formed article (sheets/films/disks) during the extrusion or molding process, or by secondary annealing processes.

In accordance with the first approach, examplary materials with inherent low birefrigence include cyclic olefin copolymer (COC), specialty polyester copolymers such as OKP4 from Osaka Gas Chemical, and poly(methyl methacrylate) (PMMA). However, these materials can be expensive and/or exhibit poor impact resistance (e.g., PMMA).

In accordance with the second approach, in an effort to reduce the residual stress in an extruded optical sheet/film, a reduction in the mechanical loads (pressure or web tension) is applied to the polymer melt while the melt solidifies in the sheet extrusion processes casting the molten web onto a single chill roll without nipping, or using a compliant roll as one of the nip rollers for the melt calendering extrusion process. These approaches can enable low optical retardation of the resulting sheet through reduced residual stress, but can also limit the ability to impart functional surface features (e.g., micro-lenses, prismatic features, or matte patterns) to the film or sheet for light management purposes due to lack of sufficient nip pressure in a melt calendering process. If the compliant nip roll is a roll with rubber surface, this approach also suffers a low extrusion line throughput due to the inefficient cooling of the polymer melt at the rubber roll surface which is not a good heat conductor.

Alternatively, a substrate film can be coated with a cross-linkable liquid coating (e.g., a crosslinkable acrylic coating liquid) at one of its surfaces. A light management surface texture is then introduced to the liquid coating surface via micro-replication process followed by solidification of the texture pattern by a UV radiation process. The micro-replication process using liquid monomer coating typically does not cause significant increase in optical retardation of the finished film. However, this method is more costly than a direct calendering extrusion or injection-molding process. In addition, the multilayer article is not 100 percent thermoplastic polymer and cannot be easily recycled.

Therefore, there is a need for thermoplastic optical films and sheets with a light management surface texture, low optical retardation, and good mechanical properties that are produced through a cost effective method.

BRIEF DESCRIPTION

Disclosed herein are multilayered articles and methods of making and using the same.

A coextruded multilayered thermoplastic article including: a first layer with a first side and a second side and with a first surface texture on the first side, wherein the first layer comprises a first transparent thermoplastic polymer having a first stress optical coefficient ($C_{m1}$) measured at 20° C. above the glass transition temperature of the first polymer; a second layer located adjacent the second side and comprising a second transparent thermoplastic polymer having a second stress optical coefficient ($C_{m2}$) measured at 20° C. above the glass transition temperature of the second matrix; wherein a relation between the first stress optical coefficient and the second stress optical coefficient is Formula (A) $C_{m2} > 4(C_{m1})$ (Formula A) wherein the thickness of the first layer measured from the highest peaks of the first surface texture to the second side of the first layer is greater than 1.5 times Rz of the first surface texture but less than or equal to 75% of the total thickness of the article; wherein the second layer has a second layer thickness that is greater than or equal to 25% of the total thickness of the article; and wherein the optical retardation of the article is less than or equal to 150 nm. The above described and other features are exemplified by the following figures and detailed description.

BRIEF DESCRIPTION OF THE DRAWINGS

Refer now to the figures, which are exemplary embodiments, and wherein the like elements are numbered alike

DETAILED DESCRIPTION

Figure 1:
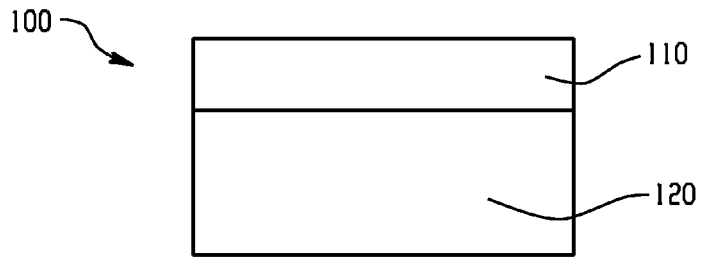
FIG. 1 is cross sectional view of a multilayered article.
Figure 2A:
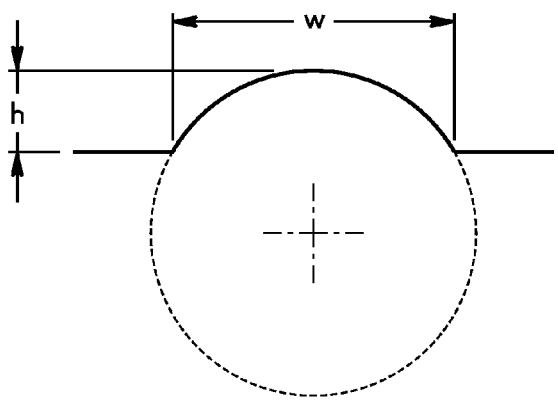
FIGS. 2A-2D are illustrations of microstructure elements for a specially structured surface texture type.
Figure 2B:
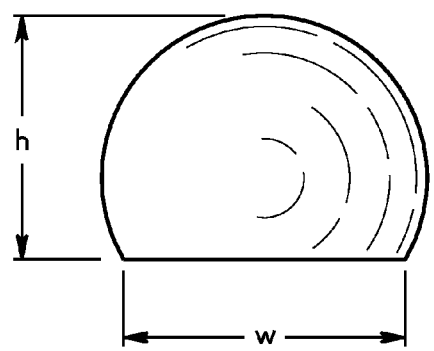
Figure 2C:
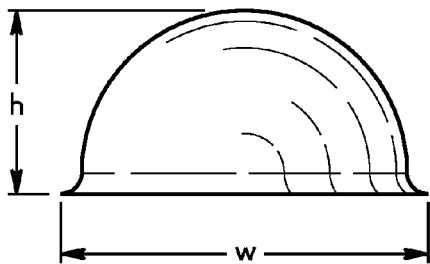
Figure 2D:
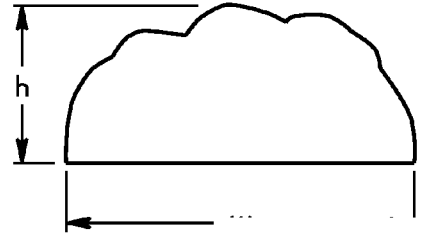

Disclosed herein are thermoplastic multilayered articles (e.g., sheets, films) comprising both low optical retardation and a light management surface texture, and methods of making and using the same. As used herein "low optical retardation" means an optical retardation that is less than or equal to 150 nanometers (nm). The low optical retardation of the multilayered article can be achieved through the use of a first layer having a significantly lower stress optical coefficient than other layer(s) of the multilayered article and/or optimized co-extrusion processing conditions (e.g., at least two times lower, three times lower, or four times lower). A primary surface texture for light management function is created onto the surface of the first layer with lower stress optical coefficient (e.g., lower than that of the other layers), and that the first layer has a first layer thickness measured from the highest peaks of the first surface texture (i.e. the primary surface texture) to the other side of the first layer that is greater than 1.5 times Rz of the first surface texture. Rz can generally be described as Rz is defined as the maximum height of an assessed profile, given by summation of the highest peaks of the profile (Rp) and the deepest valleys of the profile (Rv) averaged for the numbers of the sampling lengths within an evaluation length of the profile.

The primary surface texture can be one of several types having light management abilities, such as diffusion ability or light turning/directing ability. A generally matte surface texture comprising matte topography of peaks and valleys of non-particular geometry can provide strong light diffusion functionality and uniform light distribution over the surface of the film. The generally matte surfaces are typically characterized by means of standard surface finish attributes such as Average Roughness (Ra) or Peaks Count (Rpc). Diffuser films with general matte surfaces having Ra less than 1.2 micrometers (μm) and Rpc more than 50 peaks per centimeter (peaks/cm) can be beneficial for superior image quality in Ultra-High Definition (UHD) displays. Diffuser films with matte surfaces having Ra less than 1.0 μm and Pc more than 80 peaks/cm can be more beneficial for UHD displays. Diffuser films with matte surfaces having a Ra that is less than 0.7 μm and Pc more than 100 peaks/cm can be even more beneficial for UHD displays.

A specially structured surface texture that comprises a plurality of microstructure elements of distinctive geometry such as microlens, prisms, pyramids, or lenticular lens can provide strong light turning functionality while providing a degree of light diffusion functionality or hiding power necessary to mask light source arrangement details or structural patterns on components of an LCD display. The specially structured surface textures are typically characterized by geometric attributes of the individual microstructure elements. Aspect ratio, defined as a characteristic height divided by a characteristic size of the base of the element, is one key attribute denoting the patterns ability to turn/direct light as illustrated in FIGS. 2A-2D. The primary surface texture on the outer layer can also affect mechanical abrasion behavior of the multilayered article. While a general matte surface texture having low roughness levels are desirable for UHD display applications, reducing the roughness negatively impacts the abrasion resistance of the surface. When mechanical abrasion resistance of the primary surface texture is desired, the outer layer that carries the primary surface texture is designed from a material having suitable mechanical properties (e.g., high pencil hardness). Such surface texture can be a general matte surface texture or a specially structured surface texture including microlens features, prismatic features, pyramid features or lenticular features. The multilayered articles can be used as light diffusing films or sheets for digital displays, windows, lighting covers, and other applications where both light diffusion effect and a low optical retardation of the article are beneficial.

Birefringence in a polymeric article is fundamentally related to orientation and deformation of its constituent polymer molecules. Residual birefringence of the molded or extruded thermoplastic polymeric article can be influenced by several factors including the chemical structure of the raw material from which the article is fabricated, the degree of molecular orientation therein, mechanical stresses applied during melt processing, cooling rate, and thermal relaxation or annealing of the polymeric article during the fabrication process. Specifically, the observed birefringence (Δn) of a molded or extruded thermoplastic article is typically a function of the stress optical coefficient, C, of its constituent thermoplastic resin(s), and mechanical stress (Δσ) introduced during the extruding or molding process of the article. The relationship between the observed birefringence (Δn), stress optical coefficient (C), and mechanical stress (Δσ) applied to the thermoplastic polymeric article can be generally expressed as:

$$\Delta n = C^* \Delta \sigma.$$

The stress optical coefficient of a thermoplastic polymer is a function of temperature of the polymer. In particular, the stress optical coefficient (C) can decrease significantly in amplitude when the temperature of the polymer decreases from above the glass transition temperature (Tg) or a melting point (Tm) of the polymer to below Tg or Tm. During the extrusion or molding process of a thermoplastic article, the temperature typically cools from a melt temperature, across Tg or Tm, and down to ambient temperature. Hence, the mechanism of forming the final observed birefringence of an extruded or molded thermoplastic article is a complex process. However, we believe that the stress optical coefficient of the polymer at its molten status (Cm) plays a more dominant role in determining the final birefringence of the formed article than that at its solid state (Cs), especially for a molding or extrusion process which applies high pressure or high mechanical load upon the polymer melt, and then cool the melt quickly to the solid. The optical retardation (Retardation) is proportional to the average birefringence (Δn) of an article, which can be expressed as:

Retardation=Δ$n$*thickness(of the article).

Table 1 lists the stress optical coefficient (Cm) values of several transparent thermoplastic polymers in molten or rubbery state, which were measured using the rheo-optical methods according to exemplary work that include the 1991 paper by Wimberger-Friedl ("The peculiar rheo-optical behavior of bisphenol-A-polycarbonate and polymethyl-methacrylate", Rheol Acta 30:329-340 (1991)) and the 2012 paper by Inki Min and Kyunghwan Yoon ("Dynamic measurement of stress optical behavior of three amorphous polymers", Korea-Australia Rheology Journal, 24:73-79 (2012)).

TABLE 1

| Examples of transparent thermoplastic resins (manufacturers) | Approximate Cm value* (Brewsters, $10^{-12}$ $Pa^{-1}$) |
|---|---|
| BPA-PC | 3000~4000** |
| PMMA | −30** |
| OKP4 (Osaka Gas Chemical) | −300~−500 |
| Cyclic olefin copolymer Topas 5013 | −700 |
| SAN/PMMA blend | −250~250 |

*Cm values reported here were measured at 20° C. above glass transition temperature of the polymer (Tg)
**Cm values for BPA-PC and PMMA were reported in the paper by Wimberger-Friedl in 1991

The multilayered articles described herein include at least two layers of transparent thermoplastic resins. As used herein, transparent means a light transmission of each thermoplastic resin (Tvis) of at least 85%. As used herein, Tvis and haze are measured in accordance with Gardner Haze-plus instrument designed per ASTM D1003-00, Procedure A (the resin is molded into a 1 millimeter (mm) thick plaque with smooth surfaces) with D65 illuminant and 10 degree observer angle. The first layer can be an outer layer that has a lower Cm than the second layer. The first layer also includes a primary surface texture (i.e., a first surface texture) which is either a generally matte surface texture or a specially structured surface texture comprising a plurality of microstructure element features such as micro-lenses, prismatic features, lenticular, and pyramidal features. The thickness of the first layer measured from the highest peaks of the first surface texture to the next layer interface is greater than 1.5 times Rz of the first surface texture. In addition, the article can include an optional tie layer between the first layer and second layer. The optical haze of the multi-layer article can be greater than or equal to 30% as measured in accordance with ASTM D1003-00. The total optical retardation of the article can be less than or equal to 150 nanometers (nm). The total optical retardation of the article can be less than or equal to 80 nm. The total optical retardation of the article can be less than or equal to 50 nm. The total optical retardation of the article can be less than or equal to 20 nm.

The first layer can have a pencil hardness greater than or equal to H as measured in accordance with ASTM D3363. The first layer can include a thermoplastic acrylic polymer selected from poly(methyl methacrylate) (PMMA) homo-polymer, copolymers of methyl methacrylate (MMA) and at least one other acrylate or methacrylate such as alkyl acrylate or alkyl methacrylate, copolymer of MMA and acrylic acid or methacrylic acid, and combinations comprising at least one of the foregoing. The second layer can include a polycarbonate (PC) which is a Bisphenol-A polycarbonate, a copolymer of Bisphenol-A polycarbonate, or a combination comprising at least one of the foregoing.

The multilayered articles can include at least three layers of transparent thermoplastic resin. For example, the first and third layers can form outer layers with a second layer located between the first and second layers. The first and third layers can be made from the same material, or different materials. The layers can be in direct contact. The articles can also include optional tie layers between one or more of the first, second, and third layers. The first and third layers can include a material with lower Cm than the second layer. The first layer also includes a primary surface texture (i.e., the first surface texture) that is of light management function on its outer surface. The thickness of the first layer measured from the highest peaks of the first surface texture to the second side of the first layer can be greater than 1.5 times Rz of the first surface texture, for example, greater than or equal to 2.0 times Rz of the first surface texture. The optical haze of the multi-layer article can be greater than or equal to 30% as measured in accordance with ASTM D1003-00. The total optical retardation of the article can be less than or equal to 150 nanometers (nm). The total optical retardation of the article can be less than or equal to 80 nm. The total optical retardation of the article can be less than or equal to 50 nm. The total optical retardation of the article can be less than or equal to 20 nm.

The first layer and third layers can include a thermoplastic acrylic polymer selected from poly(methyl methacrylate) (PMMA) homo-polymer, copolymers of methyl methacrylate (MMA) and at least one other acrylate or methacrylate such as alkyl acrylate or alkyl methacrylate, copolymer of MMA and acrylic acid or methacrylic acid, and combinations including at least one of the foregoing. The second layer can include a polycarbonate.

The primary surface texture can include a generally matte and "fine" texture. As used herein "fine" texture refers to generally matte surface textures that have an average roughness (Ra) equal to or less than 1.2 μm, and peak count (Rpc) greater than or equal to 50 peaks/cm. Peak count (Rpc) refers to as the number of local roughness peaks and valleys which project through a selectable band centered around the profile mean line. The count is determined over the evaluation length and is reported in peaks per centimeter. Surface Roughness (Ra) and Peak count (Rpc) are measured using standard surface profiling instruments such as Kosaka 1700a Profilometer from Kosaka Laboratories, Tokyo, Japan. The procedures set forth in ISO 4287:1997 are followed to configure the instrument and measure the surface profile parameters such as Ra, Rp, Rv, Rz and Rpc. Rz is given by summation of the highest profile peak (Rp) and the deepest profile valley (Rv) according to ISO 4287. A scan length of at least 5.6 mm (giving at least a 4.0 mm net evaluation length), a Gaussian data filter, and a 0.8 mm filer cut-off are used. For peak counting, a ±0.5 μm symmetric band around the profile mean line was set to report Rpc. For the examples and comparative examples in this application, the surface profile data of a surface texture are measured with 5 profile scans along the extrusion direction (i.e., machine direction) of the film/sheet web and another 5 profile scans along the transverse direction of the web, and then the averaged surface profile data of the total 10 scans are recorded as the result. A sheet with such a "fine" texture is beneficial for use as display films in backlights for UHD LCD displays. However, when the texture of the sheet has relatively large average roughness (e.g., Ra>1.2 μm) and Rpc is lower than 50 peaks/cm, the sheet can have graininess appearance in the display applications, which is believed to be caused by an optical lensing effect of large peak or valley surface features that are at scattered and isolated surface locations. The graininess appearance become visible and regarded as defects when the size of these large peak or valley feature is comparable to or larger than the pixel size of the display, especially for UHD displays.

The multilayered articles can be made with a melt extrusion or molding process in which a high pressure or mechanical stress can be applied to the polymer melt to facilitate forming the shape and/or surface textures of the article. As used herein, a pressure higher than or equal to 10 bars can be regarded as high).] The process involves cooling of all the layers of thermoplastic resins from melt to solid under pressure or stress.

"Polycarbonate" as used herein means a polymer having repeating structural carbonate units of formula (1)

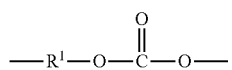

(1)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

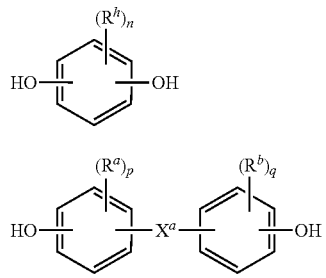

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific examples of bisphenol compounds of formula (3) include 2,2-bis(4-hydroxyphenyl) propane ("bisphenol A" or "BPA"), 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used to form copolymers. In a specific embodiment, the polycarbonate is a linear homopolymer derived from bisphenol A, in which each of $A^1$ and $A^2$ is p-phenylene and $Y^1$ is isopropylidene in formula (3).

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

As shown in FIG. 1, article 100 comprises two transparent thermoplastic layers including first layer 110 and second layer 120. An optional layer can be located between first layer 110 and second layer 120. The Cm (stress optical coefficient in the molten or rubbery state) of first layer 110 is more than 4 times lower than that of second layer 120. First layer 110 can include a first layer thickness that is measured from the highest peaks of the first surface texture on the first side (i.e., the top side of layer 110 in FIG. 1) to the second side of the first layer and is greater than 1.5 times Rz of the first surface texture but less than or equal to 75% of the total thickness of article 100.

The first layer 110 and second layer 120 can include a transparent thermoplastic polymer. First layer 110 can include an acrylic polymer selected from poly(methyl methacrylate) (PMMA) homo-polymer, copolymers of methyl methacrylate (MMA) and at least one other acrylate or methacrylate such as alkyl acrylate or alkyl methacrylate, copolymer of MMA and acrylic acid or methacrylic acid, cyclic olefin copolymer, polyester copolymer, blends of a styrene acrylonitrile copolymer and a PMMA with or without comonomers, and combinations comprising at least one of the foregoing. Second layer 120 can include a polycarbonate (e.g., BPA-PC), a polyester copolymer, blends of polycarbonate and polyester copolymers, and combinations comprising at least one of the foregoing. First layer 110 can have a first layer thickness that is measured from the highest peaks of the first surface texture on the first side (i.e., the top side of layer 110 in FIG. 1) to the second side of the first layer and is greater than 1.5 times Rz of the first surface texture but less than or equal to 75% of the total thickness of article 100. The overall thickness of article 100 can be, for example, 25 micrometers (µm) to 6 mm.

Article 100 can include a primary surface texture on the outer surface side of the first layer 110, i.e., on the side opposite the interface with second layer 120. The primary surface texture can comprise a plurality of geometric microstructure elements including microlenses, polyhedral shapes (e.g., prisms, pyramidal shapes, cube corner shapes, and so forth), lenticular shapes, generally matte surface features, and combinations comprising at least one of the foregoing. The average aspect ratio of these geometric shapes is greater than or equal to 0.05. The primary surface texture can also include only a generally matte surface texture with Ra that is equal to or less than 1.2 micrometer, and Rpc can be greater than or equal to 50 peaks/cm. In addition, the primary surface texture can be alternatively formed through the inclusion of one or more protruded additive particles that are at least partially embedded in the first layer of article 100.

The total optical retardation of article 100 can be less than 150 nm. As used forth herein, optical retardation is measured according to StrainOptics™ SCA-1500 instrument, which is a spectrophotometric method described in details in the paper by Redner in 1985 (A. S. Redner, "Photoelastic measurements by means of computer-assisted spectral contents analysis," Expt. Mech., 25, 148-153 (1985).). For measuring the optical retardation of a film or sheet sample with a light diffusing surface texture, the surface texture must be "washed out" (i.e., fully covered) by a thin layer of transparent fluid that has the same refractive index as that of the textured surface (i.e., index-matching fluid) before the measurement. The total optical retardation of article 100 can be less than 80 nm. The total optical retardation of article 100 can be less than 50 nm. The total optical retardation of article 100 can be less than 20 nm.

Figure 3:
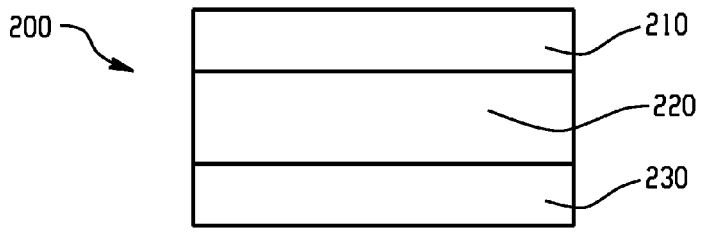
FIG. 3 is cross sectional view of a multilayered article.

As shown in FIG. 3, three-layer article 200 comprises a first layer 210, second layer 220, and third layer 230. First layer 210 and third layer 230 can be the outer layers. Article 200 can optionally include tie layers between the first, second, and third layer. First layer 210 and third layer 230 can be made of the same or different transparent thermoplastic resins. Second layer 220 is made of transparent thermoplastic resin whose inherent stress optical coefficient in melt or rubbery state is more than 4 times that of first layer 210 and third layer 230. First layer 210 can have a first layer thickness that is measured from the highest peaks of the first surface texture on the first side (i.e., the top side of layer 210 in FIG. 3) to the second side of the first layer and is greater than 1.5 times Rz of the first surface texture but less than or equal to 75% of the total thickness of article 100. The overall thickness of article 200 can be from 25 micrometers to 6 mm.

First layer 210 and third layer 230 can include an acrylic thermoplastic polymer selected from poly(methyl methacrylate) (PMMA) homo-polymer, copolymers of methyl methacrylate (MMA) and at least one other acrylate or methacrylate such as alkyl acrylate or alkyl methacrylate, copolymer of MMA and acrylic acid or methacrylic acid, and combinations comprising at least one of the foregoing. Second layer 220 can include a polycarbonate (e.g., BPA-PC).

First layer 210 can include a primary surface texture on the side opposite the interface with second layer 220. The primary surface texture can comprise a plurality of geometric microstructure units including microlenses, polyhedral shapes (e.g., prisms, pyramidal shapes, cube corner shapes, and so forth), lenticular shapes, generally matte surface features, and combinations comprising at least one of the foregoing. The average aspect ratio of the present geometric shapes is greater than or equal to 0.05. The primary surface texture can also include only a generally matte surface texture with Ra that is equal to or less than 1.2 micrometer, and Rpc can be greater than or equal to 50 peaks/cm.

In addition, the primary surface texture can be alternatively formed through the inclusion of one or more protruded additive particles that are at least partially embedded in the first layer 210 of article 200. The additive particles (also known as light diffusing particles) can include light diffusing organic or inorganic materials, or combinations of organic and inorganic materials. Examples of light diffusing organic materials can include polystyrene, poly (styrene-acrylonitrile) (SAN), poly(acrylates); poly(alkyl methacrylates) (for example poly(methyl methacrylate) (PMMA)); poly (tetrafluoroethylene) (PTFE); silicones, for example hydrolyzed poly(alkyl trialkoxysilanes) and polymethylsilsesquioxane, commercially available under the trade name Tospearl™ from Momentive Performance Materials Inc.; or a combination comprising at least one of the foregoing organic materials. The above organic light diffusing materials are typically cross-linked materials so that the diffusing particles can maintain the original size and shape during the melt processing step of the thermoplastic resin that comprises these diffusing particles as additives. Examples of light diffusing inorganic materials can include materials comprising talc, calcium carbonate, antimony, silicon, titanium, zirconium, barium, and zinc, for example the oxides or sulfides of the foregoing such as silica, zinc oxide, antimony oxide and mixtures comprising at least one of the foregoing inorganic materials. The inorganic materials may, if desired, also be treated with an organic coating. The additive particles can be present in an amount of 0.1 to 10 wt %, or 0.5 to 8 wt %, based upon a total weight of the layer comprising the additive particles.

The total optical retardation of article 200 can be less than or equal to 150 nm as measured using StrainOptics™ SCA-1500 instrument. The total optical retardation of article 200 can be less than or equal to 80 nm. The total optical retardation of article 200 can be less than or equal to 50 nm. The total optical retardation of article 200 can be less than or equal to 20 nm.

Figure 4A:
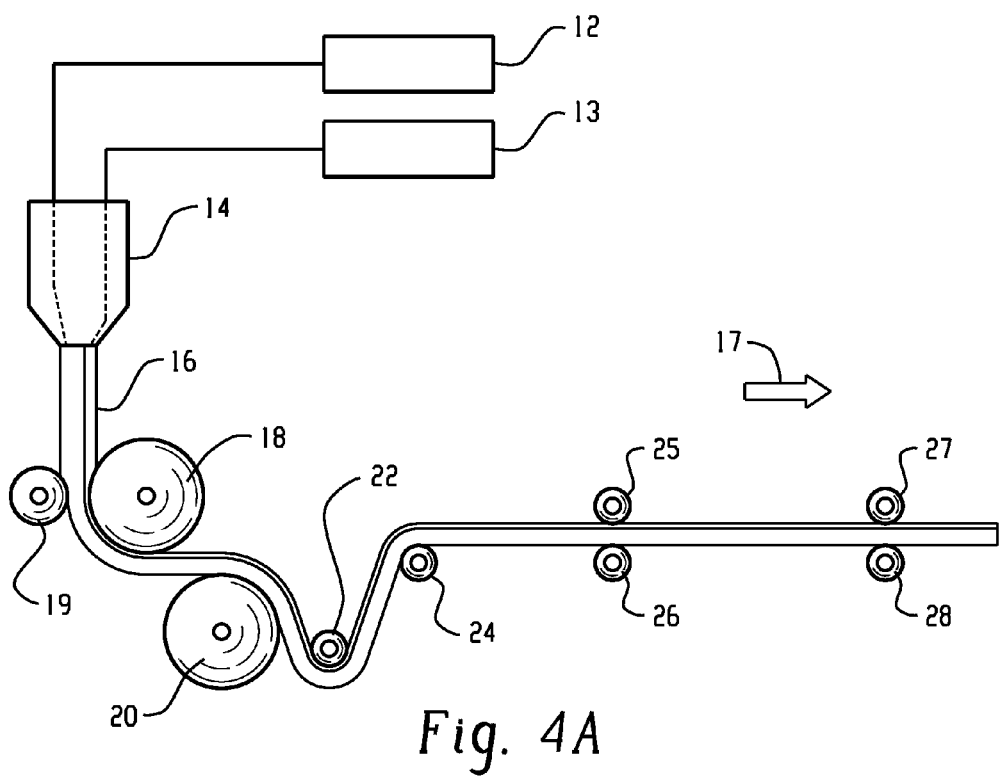
FIG. 4A is a schematic of a melt calendering system for manufacturing a multilayered article.
Figure 4B:
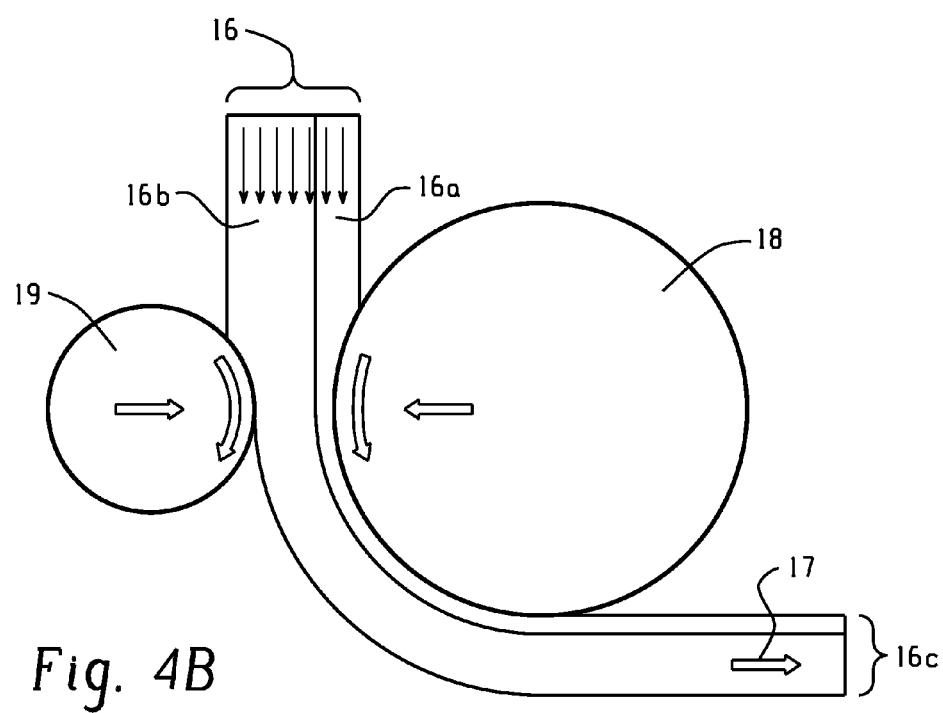
FIG. 4B is an illustration of certain elements of the calendering system of FIG. 4A.

The multilayered articles can be made with a melt co-extrusion with calendering rollers, injection molding or compression molding process in which a high pressure (e.g., higher than 10 bars) or stress can be applied to the polymer melt to facilitate forming the shape and/or surface finish or surface textures of the article. The process involves cooling of all the layers of thermoplastic resins from melt to solid under pressure or stress. FIGS. 4A and 4B illustrate an exemplary melt calendering system for manufacturing a textured multilayered article, wherein first layer 16a is in contact with master roller 18 that carries the primary surface texture of the sheet.

As shown in FIG. 4A, the melt calendering system includes at least two extruders, one main extruder 12 and one side extruder 13, which extrude different thermoplastic resins for first layer 16a and second layer 16b respectively, a multi-manifold co-extrusion die 14, cylindrical rollers 18, 19, 20, 22, 24, 25, 26, 27, 28 where the rollers 18 and 19 are the first calendering nip rollers, and roller 18 carries the primary surface texture pattern of the multilayer article, wherein roller 18 can also be referred to as the master roller.

The extruders 12 and 13 can heat the thermoplastic components above a predetermined temperature to induce the components to have a liquid state (e.g., molten plastic). The outputs of the both extruders are operably coupled to the multi-manifold co-extrusion die 14 through the melt adaptor (not shown). Die 14 can be a vertical die.

Cylindrical rollers 18 and 19 are provided to receive multilayered molten web 16 therebetween from the die 14, and can form a primary surface texture onto the surface of first layer 16a of the multilayered article under the nip pressure between cylindrical rollers 18 and 19, and also cool the textured molten web to a textured solid web. Cylindrical rollers 18 and 19 can be constructed from metal (e.g., steel) and are operably coupled to the roller cooling system (not shown). The roller cooling system maintains a temperature of rollers 18 and 19 below a predetermined temperature to solidify or partially solidify the multilayered molten polymer web 16 as it passes between cylindrical rollers 18 and 19. Cylindrical roller 18 is the master roller carrying the primary surface texture pattern of the final multi-layer article that is described in the foregoing paragraphs.

To make of an optical film with a structured texture such as the one comprising a plurality of linear prisms or micro-lens, a high nip pressure (e.g., >10 bars) between the first calendering rollers 18 and 19 is generally applied to ensure that the texture replication from the master roller to the surface of the film is efficient and also uniform across the web width. The high nip pressure between the rollers 18 and 19 can cause high optical retardation in the resulting film if the materials used to construct the article have a large stress optical coefficient Cm, as explained in the previous paragraphs. However, it is the belief of the inventors that the final residual mechanical stress of the article introduced during the calendering extrusion process can be more concentrated in the portions of the article that are near the outer surfaces of the article ("skin zones") than the center region or core zone of the article because the skin zones are cooled much more quickly below Tg or Tm of the polymer (i.e., solidified) than the core zone. Hence, the stress due to high nip pressure of the calendering process is frozen in the skin zones while the stress in the core zone can be relaxed because the polymer therein is maintained at melt state longer. The surface temperatures of the rollers 18 and 19 can be adjusted to control the cooling rate of the polymer melt web, which can in turn affect the thickness of the above skin zones. The inventors believe that the thickness of such skin zone is also affected by the depth of the surface texture on the roller that is in contact with the polymer melt web during the calendering process—the deeper the surface texture of the roller is, the thicker the corresponding skin zone. More specifically, it is believed that the mechanical stress is more concentrated on the first skin zone that is in contact of the roller 18 compared to the second skin zone that is in contact with the roller 19. This is due to a larger contact area between the first skin zone and the roller 18, to ensure efficient replication of the primary texture. Thus, the first skin zone is cooled more quickly than the second skin zone. Accordingly, a thermoplastic material with a very low Cm, or a lower Cm at least by 4 times lower versus that of other layer(s) can be used in first layer 16a where the mechanical stress is more concentrated while the other layer(s) of the article can be constructed with thermoplastic materials with relatively higher Cm. Such a multilayer article can have a significantly lower retardation compared to a single-layer article where the first layer comprises the same material as the other layers. First layer 16a includes the primary surface texture of the article. Also, when the thickness of first layer 16a is greater than the thickness of the first skin zone (e.g., where the concentrated stress due to the nip pressure exists) the greatest retardation reduction benefit can be achieved versus a single-layer article even though the first layer thickness may be only a small percentage of the total film thickness.

Cylindrical roller 20 is configured to receive partially solidified plastic web 16c after layer 16 has passed between calendering nip rollers 18, 19. The position of cylindrical roller 20 can be adjusted to vary an amount of surface area of plastic layer 16 that contacts cylindrical roller 18. Cylindrical roller 20 is also operably coupled to the roller cooling system (not shown) that maintains the temperature of roller 20 below a predetermined temperature for solidifying the plastic layer 16. Roller 20 can be driven by a motor (instead of relying on the friction between the web and the surface of roller 20) to rotate in order to minimize the web tension that can be applied to partially solidified polymer web 16c along machine direction 17. Cylindrical rollers 22 through 28 are conveying rollers downstream, where rollers 25, 26, 27, and 28 are provided to receive the plastic layer 16c therebetween and to move the plastic layer 16c toward downstream.

The method described above for making a multilayered article is only an exemplary method. Other methods based on the same concept, especially involving use of a different thermoplastic material with significantly lower Cm for the first layer 16a (i.e., the layer 110 in FIG. 1) versus the other layers of the article, and the first layer 16a having to have a minimum thickness in order to achieve a low retardation target of the article, are within the scope of this invention.

The multilayer articles of the present invention can be used for light diffusing films or sheets for digital displays, windows, lighting covers, and other applications where both light diffusion effect and a low optical retardation of the article are beneficial.

Set forth below are examples of multilayered articles formed using manufacturing systems and methods described above.

EXAMPLES

Figure 7:
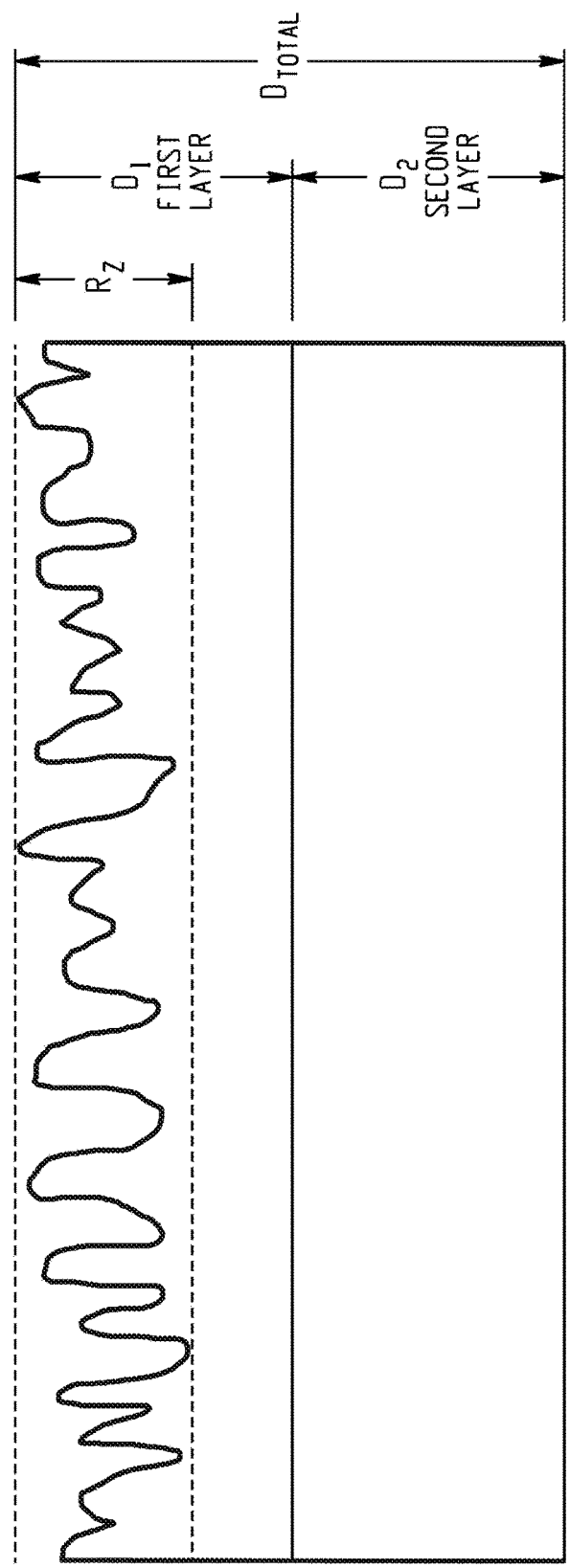
FIG. 7 is a graphical illustrating the measurement of Rz.

In the first set of examples, four 250-micrometer thick film samples were prepared and measured, with results listed in Table 2. Examples 1-3 are the two-layer articles (i.e., the configuration of FIG. 1) including a PMMA layer of varying thickness (the first layer) and a PC core layer (the second layer). Comparative Example 1 was a PC monolayer. Examples 1-3 and Comparative Example 1 were formed using the same method that is described above and illustrated by FIGS. 4A and 4B, wherein a vertical die and a pair of steel calendering nip rollers were used. During their manufacturing processes, the same nip pressure of 18 bar between the calendering nip rollers 18 and 19 was applied to all four samples, the PMMA layer of Examples 1-3 was in contact with the roller 18 that carries a smooth surface texture with a very low Rz (e.g., less than 1 micrometer). The roller 20 was driven by a motor in order to minimize the web tension applied along the machine direction of the web. As noted in Table 2, the temperature of roller 18 that is in contact with PMMA layer is 22° C. lower than Tref. D1 refers to PMMA layer thickness measured from the top side of the PMMA layer (i.e., including the peaks of the PMMA surface texture) to the second side of the PMMA layer (i.e., PMMA layer/PC layer interface here) as illustrated in FIG. 7 where Dtotal is the total thickness of the film measured from the top side of the film (including the peaks of the PMMA surface texture) to the bottom side of the film using a micrometer probe, and D2 is measured from the second side of the first layer to the bottom side of the film in a cross-sectional optical microscopy image. D1 is the difference between the above measured Dtotal and D2. Ra, Rz were measured on the surface of the PMMA layer using 2D Kosaka surface profilometer per ISO 4287:1997. Retardation is the maximum retardation of the film across the useful web area (i.e., excluding web edges that will be trimmed off).

TABLE 2

| Example # | D1 [um] | R18 temp. [° C.] | Nip Pressure [bar] | Ra [um] | Rz [um] | Retardation [nm] | Haze [%] |
|---|---|---|---|---|---|---|---|
| Comparative example 1 | 0 | Tref | 18 | 0.1 | 0.9 | 100 | <0.5% |
| Example 1 | 36 | Tref- 22 | 18 | 0.1 | 0.7 | 38 | <0.5% |
| Example 2 | 41 | Tref- 22 | 18 | 0.1 | 0.5 | 21 | <0.5% |
| Example 3 | 66 | Tref- 22 | 18 | 0.1 | 0.9 | 16 | <0.5% |

Figure 6:
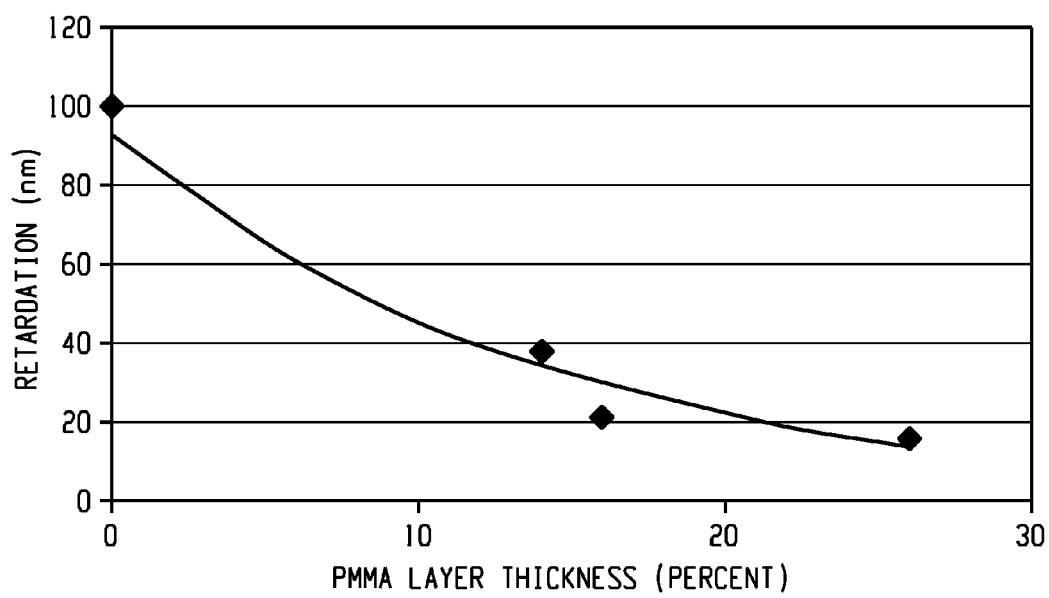
FIG. 6 is a graph illustrating the results of Example 1.

As shown in Table 2, the retardations (i.e., maximum retardation measured across the web of each film) of Examples 1-3 are significantly lower than that of Comparative example 1 through the inclusion of a PMMA layer onto the primary surface textured side of the article during the manufacturing. In addition, when the thickness percentage of the PMMA layer increases from 0 up to 66 micrometers (μm) (i.e., 26% of the total film thickness), the retardation of the article monotonically drops from 100 nm to 16 nm. The trend is plotted in FIG. 6.

Figure 4C:
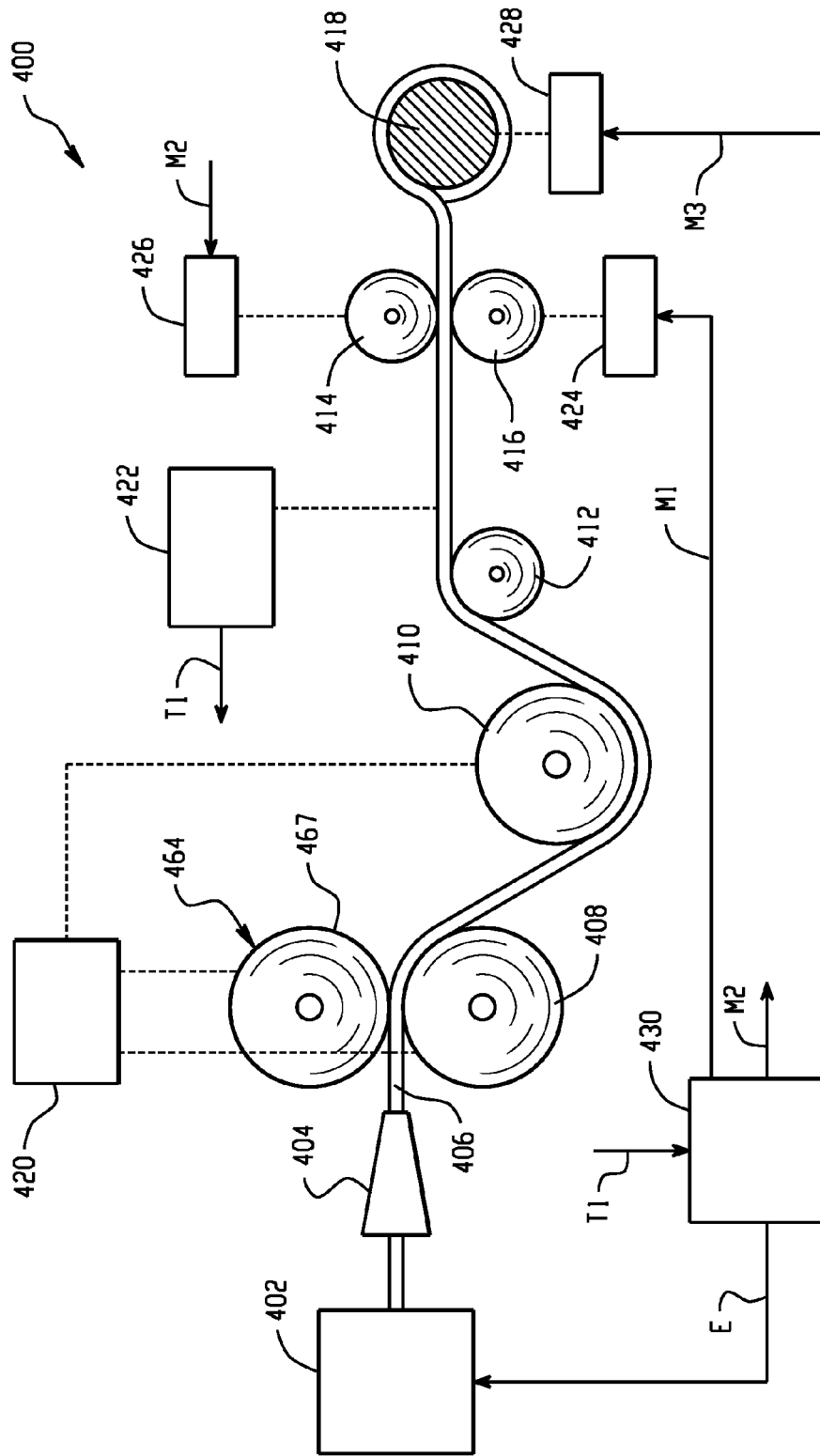
FIG. 4C is an illustration of a melt calendering system utilizing a horizontal die.

Another comparative example set is shown in Table 3. Two samples of two-layer films of 250 μm, comprising a layer of PMMA and a layer of PC, were formed using the melt calendering system described in U.S. Patent Application No. 2012/0268964, as illustrated by FIG. 4C wherein rollers 464 and 408 were both steel rollers, the calendering nip pressure was approximately 15 bars, and roller 410's rotation is driven by the friction between the web and the surface of roller 410 (instead of driven by a separate motor). The PMMA layer was in contact with roller 408 that carries a smooth surface texture with a very low Rz (e.g., less than 1 micrometer). The resulting films were measured as listed in Table 3. As shown in Table 3, the maximum retardation measured across the web of each example film remains very high even when the thickness of PMMA layer increases. This can be attributed to the high machine direction tension applied upon the partially solidified web from the first calendering nip position (between rollers 464 and 408) all the way down to "pull rolls", rollers 414 and 415, where the majority bulk of the film is already solidified. A high machine direction tension was required to create enough friction between the web and the surface of roller 410 to rotate roller 410. However, the stress from the high machine direction tension was also frozen in all layers of the multi-layer article including the polycarbonate layer during the process. The major source of the overall retardation is likely attributable to the PC layer, which has a high stress optical coefficient. Thus, introducing a PMMA layer does not drop the overall retardation of the film significantly for Comparative examples 3 and 4 versus Comparative example 2.

TABLE 3

| Example # | Thermoplastic materials used: Layer 110/Layer 120 | First Layer thickness percentage | Maximum retardation of Film across web (nm) |
|---|---|---|---|
| Comparative example 2 | PC monolayer | 0% | 794 |
| Comparative example 3 | PMMA/PC | 6% | 742 |
| Comparative example 4 | PMMA/PC | 9% | 720 |

Another set of examples is disclosed in Table 4. Two samples of three-layer films with a total thickness of 250 μm comprising a layer of PMMA on both sides of a PC core layer, were formed using the similar process as the first example set (e.g., FIGS. 4A and 4B) except that the calendering nip roller 18 carries a general matte texture (i.e., the primary surface texture) and a PMMA layer is applied to both sides of the PC core layer during the co-extrusion process. In addition, to ensure a uniform replication of the primary surface texture of the roller 18 to the outer surface of the first PMMA layer (i.e., the one in contact with roller 18), a high nip pressure of 30 bar between rollers 18 and 19 was employed for Examples 4 and 5. Comparative example 5 comprising a monolayer PC film of 250 μm was formed in a similar manner using the same calendering rollers and same nip pressure. The corresponding texture replicated from roller 18 was formed on the first outer surface of the film samples (i.e., the one in contact with roller 18 during the film manufacturing process). The resulting films were measured for surface profile data Ra and Rz of the first outer surface that carries the primary surface texture using the method described herein, maximum retardation across the web (Retardation), optical haze and the first PMMA layer thickness D1 measured from the peaks of the primary surface texture to the interface between the first PMMA layer and the PC layer, which results are listed in Table 4. As shown in Table 4, compared to comparative example 5 the retardations of the films in Examples 4 and 5 are significantly reduced. Example 5 comprising a PMMA homopolymer (8H) demonstrated slightly lower retardation than Example 4 made with the same configuration and process condition but using an impact modified PMMA copolymer grade (ZK5BR). In Examples 4 and 5 (PMMA-PC coextruded films), the temperature of roller 18 that is in contact with PMMA layer is 22° C. lower than Tref that is used for the monolayer PC film in Comparative example 5.

TABLE 4

| Example # | PMMA | D1 [um] | R2 temp. [° C.] | Nip Pressure [bar] | Ra [um] | Rz [um] | D1 – 1.5 × Rz [nm] | Retardation [nm] | Haze [%] |
|---|---|---|---|---|---|---|---|---|---|
| Example #4 | ZK5BR | 62 | Tref - 22 | 30 | 0.9 | 8.9 | 48 | 46 | 77 |
| Example #5 | 8H | 65 | Tref - 22 | 30 | 0.9 | 10.2 | 49 | 31 | 75 |
| Comparative example #5 | none | 0 | Tref | 30 | 1.1 | 12.0 | NA | 188 | 88 |

Figure 8:
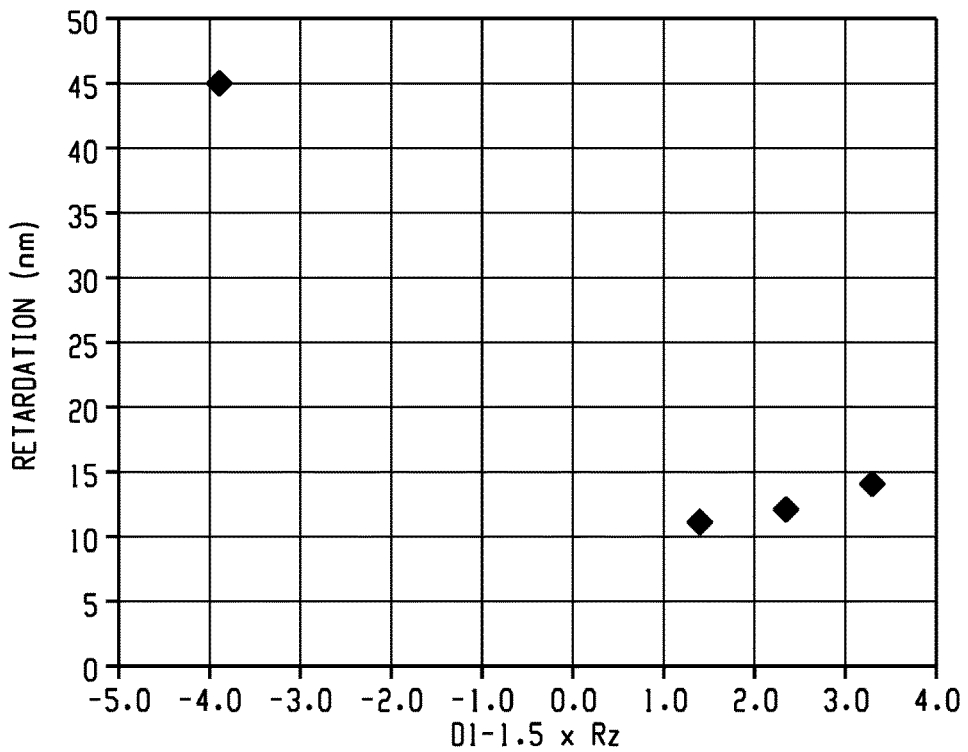
FIG. 8 is a graph illustrating the retardation version $T_{peak}$-1.5×Rz for fine textured films.

Another set of example is shown in Table 5. Several samples of two-layer films of 225 µm (multilayered articles) comprising a layer of PMMA and a layer of PC, and two monolayer PC film samples of the same thickness were formed using a similar process as the first example set (e.g., FIGS. 4A and 4B), except that a textured steel roller carrying a primary surface texture and a rubber roller (i.e., a complaint roller) were used as the calendering nip rollers 18 and 19 respectively. The samples were formed with a primary surface texture of either "fine matte" type (i.e., Ra less than 1.2 µm and Rpc more than 50 peaks/cm) or "regular matte" type (i.e., Ra higher or equal to 1.2 µm) on the first outer surface of each film (i.e., the surface in contact with roller 18 in FIGS. 4A and 4B during the film manufacturing). These PMMA/PC co-extruded samples with a "fine matte" texture were compared to a monolithic PC film with a "regular matte" texture (Comparative example #6) and also a monolithic PC film with a "fine matte" texture (Comparative example #7) in term of surface profile data (Ra, Rpc and Rz) of the primary surface texture, graininess appearance of the primary surface texture, maximum retardation (i.e., retardation in Table 5) of the film measured across the useful film web (excluding the web edges that are trimmed off), and optical haze. The results are listed in Table 5 where $P_{rep}$ is a reference pressure value used for making the monolayer PC film with the regular matte texture and is less than 5 bars. As shown in Table 5, Examples #6 and #7, and Comparative example 7 that are all with a "fine matte" texture did not have graininess appearance while comparative example 6 with a "regular matte" texture has graininess looking on the primary surface textured side. Also, both Examples 6 and 7 with a PMMA layer and a PC layer resulted in an improved scratch resistance in linear Taber result compared to Comparative example 7 where the primary surface textured side of each film was tested. In addition, Examples 7 through 9 with a PMMA layer thickness D1 of greater than 10 µm demonstrated a very low maximum retardation of less than 15 nm while Example 6 with a PMMA layer thickness of less than 5 µm demonstrated a maximum retardation even higher than that of Comparative examples 6 and 7. The retardations of these samples are low in overall because of a low nip pressure between the rubber roller and steel roller at the calendering nip position. However, introducing a PMMA layer of greater than 10 µm onto the primary textured side of the film can further reduce the maximum retardation by approximately 50%. Not to be limited by theory, it is believed that the PMMA layer thickness D1 which is measured from the first side of the PMMA layer including highest peaks of the primary surface texture to the second side of the PMMA layer should be greater than 1.5 times Rz of the primary surface texture in order to achieve the significantly reduced retardation compared to the monolayer PC case. The plot of Retardation vs (D1-1.5×Rz) is shown in FIG. 8.

TABLE 5

| Example # | D1 [um] | Nip Pressure [bar] | Ra [um] | Rpc [peaks/cm] | Rz [um] | D1 – 1.5 × Rz [um] | GA | Linear Taber result | Retardation [nm] | Haze [%] |
|---|---|---|---|---|---|---|---|---|---|---|
| Comparative example #6 | 0 | Pref | 1.5 | 57 | NA | NA | yes | 950 | 19 | 80 |
| Comparative example #7 | 0 | 2.5 × Pref | 0.6 | 71 | 5.9 | NA | no | 250 | 26 | 88 |
| Example #6 | 4.7 | 2.5 × Pref | 0.6 | 72 | 5.7 | -3.9 | no | 600 | 45 | 87 |
| Example #7 | 10.6 | 2.5 × Pref | 0.6 | 79 | 6.1 | 1.4 | no | 600 | 11 | 91 |
| Example #8 | 11.6 | 2.5 × Pref | 0.7 | 89 | 6.2 | 2.3 | no | 600 | 12 | 91 |
| Example #9 | 11.9 | 2.5 × Pref | 0.6 | 73 | 5.7 | 3.3 | no | 600 | 14 | 87 |

*GA is the graininess appearance of the primary textured side

**Ra, Rz and Rpc are measured of the primary textured side

Retardation is the maximum retardation of the film measured across the useful web area (i.e., excluding web edges that will be trimmed off)

Such a fine textured film with very low retardation of 10 nm can be used as the top light diffusing layer of a reflective polarizer application, especially in the backlighting unit of a UHD display.

Figure 5:
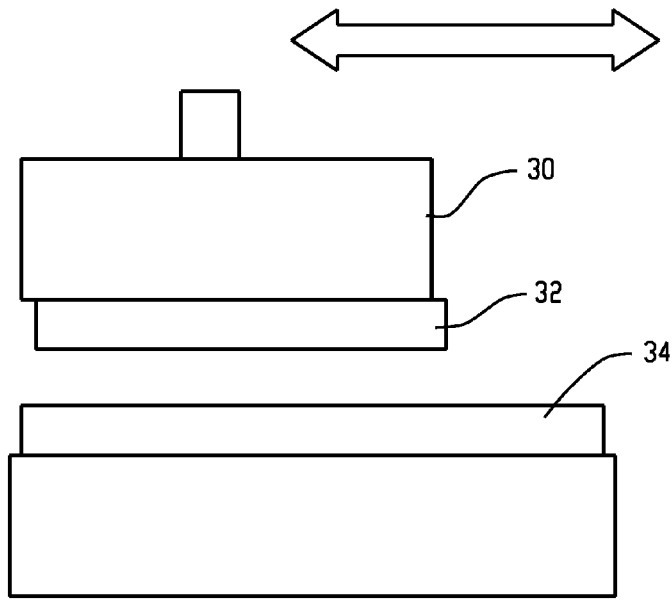
FIG. 5 is schematic illustration of Linear Taber Abrasion test method.

Linear Taber Abrasion resistance in Table 5 was measured using Taber™ Linear Abrasion tester (Model 5750) and at least a pair of duplicate film samples. The two duplicate films are placed with to-be-tested surface textured sides facing against each other. Top film 32 is attached to the sample mount accessory 30 on the linear motion arm with the to-be-tested surface texture facing down while bottom film 34 is attached to a flat table with to-be-tested surface facing up as shown in FIG. 5. Weight disks of known weight are added onto the linear motion arm. The diameter of the contact area between the two surfaces placed against each other is 10 min. The linear motion arm moves back and forth in a fixed speed of 40 mm/sec. After 10 cycles, the tester is stopped and the film samples inspected. If the scratches can be seen on at least 3 different locations across the surfaces of either film, it is judged as "failure". If both samples are OK (i.e., less than 3 scratches across the surfaces of either film) after the 10 cycles, the additional weight will be added to the linear motion arm, and the same test will be repeated with another pair of fresh sample until the samples is judged as "failure" after the 10 cycles. The weight which made the sample films to reach initial failure point is to be reported as result.

Figure 9:
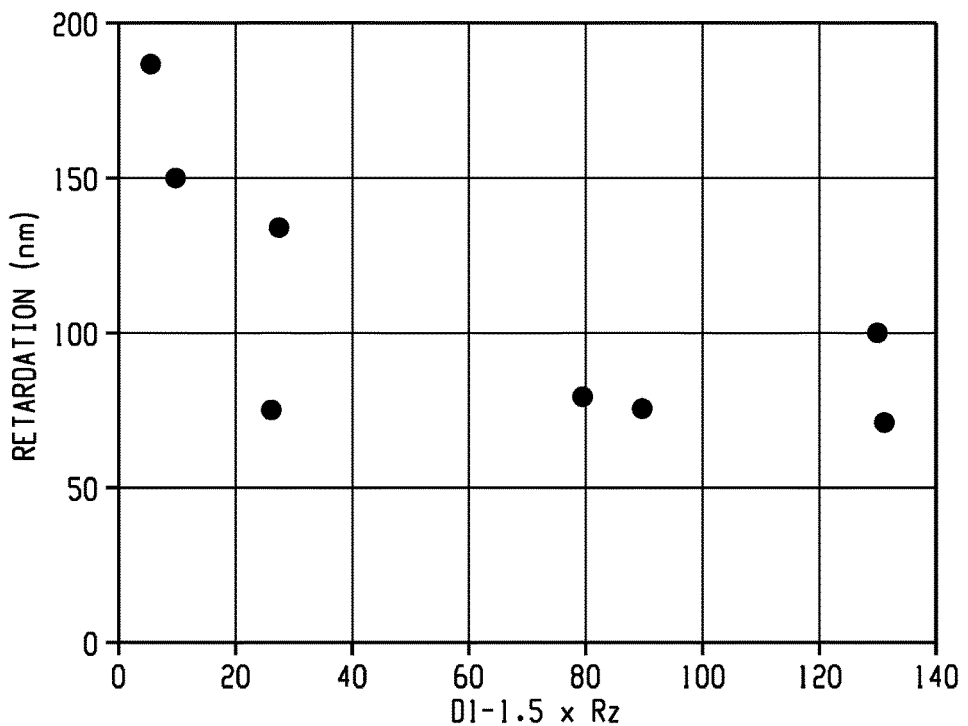
FIG. 9 is a graph illustrating the retardation version $T_{peak}$-1.5×Rz for microlens coextruded films.

Another set of inventive examples is shown in Table 6. A few samples of two-layer films of 203 μm thickness comprising a layer of PMMA (the first layer) and a layer of PC (the second layer) were formed using a similar process as the first example set (e.g., FIG. 4A), except that a hard roller with the primary surface texture of microlens array type and a steel roller with a general matte type texture were used as the calendering nip rollers 18 and 19 respectively. Processing differences occurred in the temperature of roller 18 and calendering nip pressure. A high calendering nip pressure of 55 bars was used for all the film samples in Table 6 in order to achieve a good replication of the primary texture of roller 18 to the first layer. The temperatures of rollers 18 (i.e., $R_{18}$ temp) are given in Table 6. It is also noted that the primary texture on roller 18 comprise two patterns, each of which has a plurality of microlens but with different aspect ratio of microlens on the roller 18. The film samples were formed with a microlens texture (primary surface texture) on one side and a general matte texture on the other side of the film. These samples were measured for maximum retardation of the film measured across the useful web width (excluding the web edges to be trimmed off) and the surface profile data of the primary surface textured side, which results as listed in Table 6. As shown in Table 6A, Examples 10 through 13 that comprise a coextruded PMMA layer and a PC layer have a significantly lower max retardation than the monolayer PC film in Comparative examples 8, while still maintaining a high aspect ratio of the microlens features. The same is true for Examples 14 through 17 compared to Comparative example 10. The plot of Max retardation versus (D1-1.5×Rz) for examples 10 through 17 in both Table 6A and 6B is shown in FIG. 9, which indicates that the biggest reduction in Max retardation for the coextruded PMMA/PC films was achieved when D1 is slightly larger than 1.5×Rz, and further increase of D1 seems to reach a plateau.

In contrast, Comparative examples 9 and 11 show a much higher max retardation compared to the other examples in Table 6 although D1is larger than 1.5 times Rz for these two samples. This different result is due to a much colder roller 18 temperature used for making Comparative examples 9 and 11, which caused a much faster cooling of the polymer melt at the calendering nip, hence resulting in a much thicker skin zone that is described in the previous paragraph. The skin zone of Comparative example 9 or 11 on the primary surface texture side must be greater than corresponding D1 so that the optical retardation of the film has a significant contribution from the residue stress in the second layer of the film (i.e., PC layer).

From Table 6A and 6B, the optimal roller 18 surface temperature of 18 to 27° C. below $T_{ref}$ is required to achieve the low retardation of less than or equal to 150 nm for this set of examples. In general cases, the process conditions including the temperature of the calendering roller carrying the primary surface texture, nip pressure between calendering rollers, and web tension during the film extrusion process are all important factors affecting the retardation and hence need to be optimized for achieving the low optical retardation less than or equal to 150 nm. The optimal process condition window depends on specific thermoplastic materials chosen and extrusion equipment set up for specific cases. However, the concept disclosed in this invention still apply—for light diffusing film applications with a primary surface texture, a coextruded multilayered film with a first layer and a second layer located adjacent to the first layer, wherein the first layer comprises a first thermoplastic polymer with a first stress optical coefficient ($C_{m1}$) and the primary surface texture, and the second layer comprising a second thermoplastic polymer with a second stress optical coefficient ($C_{m2}$); can show a significantly lower optical retardation than a monolayer film extruded using the second thermoplastic polymer alone, if the following conditions are also satisfied: 1) $C_{m1}$ is at least 4 times smaller than $C_{m2}$; 2) the thickness of the first layer D1 measured from the highest peaks of the first surface texture to the second side of the first layer is greater than 1.5 times Rz of the primary surface texture (FIG. 7); 3) extrusion process conditions including roller temperatures, nip pressure and web tension are optimized.

Such a microlens textured film with low retardation less than 150 nm can be used as the light diffusing layer on top of a reflective polarizer application to help enhance the luminance of the display.

TABLE 6A

| | | | | | | | | | |
|---|---|---|---|---|---|---|---|---|---|
| (Pattern A) | | | | | | | | | |
| Example # | D1 [um] | R18 temp. [° C.] | Nip Pressure [bar] | Ra [um] | Rz [um] | D1 − 1.5 × Rz [um] | AR of Microlens | Max. Retardation [nm] | Haze [%] |
| Comparative example #8 | 0 | Tref | 55 | 3.1 | 16.5 | NA | 0.41 | 220 | 100 |
| Example #10 | 30 | Tref-27 | 55 | 3.2 | 16.2 | 6 | 0.43 | 187 | 100 |

TABLE 6A-continued (Pattern A)

| Example # | D1 [um] | R18 temp. [° C.] | Nip Pressure [bar] | Ra [um] | Rz [um] | D1 − 1.5 × Rz [um] | AR of Microlens | Max. Retardation [nm] | Haze [%] |
|---|---|---|---|---|---|---|---|---|---|
| Example #11 | 52 | Tref-27 | 55 | 3 | 16.2 | 28 | 0.43 | 134 | 100 |
| Example #12 | 153 | Tref-18 | 55 | 3 | 15.3 | 130 | 0.35 | 100 | 100 |
| Example #13 | 113 | Tref-18 | 55 | 3 | 15.5 | 90 | 0.33 | 76 | 100 |
| Comparative example #9 | 52 | Tref-44 | 55 | 3.1 | 16.2 | 28 | 0.41 | 497 | 100 |

*AR of microlens is average aspect ratio of the microlens texture

TABLE 6B (Pattern B)

| Example # | D1 | R18 temp. | Nip Pressure | Ra | Rz | D1−1.5×Rz | AR | Max Ret | Haze |
|---|---|---|---|---|---|---|---|---|---|
| Comparative example #10 | 0 | Tref | 55 | 2.7 | 13.9 | NA | 0.28 | 177 | 100 |
| Example #14 | 30 | Tref-27 | 55 | 2.7 | 13.4 | 10 | 0.28 | 150 | 100 |
| Example #15 | 50 | Tref-27 | 55 | 3.1 | 16.0 | 26 | 0.29 | 75 | 100 |
| Example #16 | 153 | Tref-18 | 55 | 2.7 | 14.6 | 131 | 0.24 | 71 | 100 |
| Example #17 | 102 | Tref-18 | 55 | 2.8 | 14.8 | 80 | 0.25 | 80 | 100 |
| Comparative example #11 | 49 | Tref-44 | 55 | 3 | 15.6 | 25 | 0.26 | 461 | 100 |

Set forth below are some embodiments of multilayered articles and methods of making multilayered articles as disclosed herein.

Embodiment 1

A coextruded multilayered thermoplastic article including: a first layer with a first side and a second side and with a first surface texture on the first side, wherein the first layer comprises a first transparent thermoplastic polymer having a first stress optical coefficient ($C_{m1}$) measured at 20° C. above the glass transition temperature of the first polymer; a second layer located adjacent the second side and comprising a second transparent thermoplastic polymer having a second stress optical coefficient ($C_{m2}$) measured at 20° C. above the glass transition temperature of the second matrix; wherein a relation between the first stress optical coefficient and the second stress optical coefficient is Formula (A) $C_{m2} > 4(C_{m1})$ (Formula A) wherein the thickness of the first layer measured from the highest peaks of the first surface texture to the second side of the first layer (i.e., D1 as illustrated in FIG. 7) is greater than 1.5 times Rz of the first surface texture but less than or equal to 75% of the total thickness of the article; wherein the second layer has a second layer thickness that is greater than or equal to 25% of the total thickness of the article; and wherein the optical retardation of the article is less than or equal to 150 nm.

Embodiment 2

The coextruded multilayer article of Embodiment 1, wherein Rz of the first surface texture is greater or equal to 5 micrometers Embodiment 3

The coextruded multilayer article of any of Embodiments 1-2, wherein the first transparent thermoplastic polymer is selected from a polymer of methyl methacrylate (PMMA) with or without comononiers, cyclic olefin copolymers; polyester copolymers with inherent low birefringence, a blend of a styrene acrylonitrile copolymer and a PMMA with or without comonomers, or a combination comprising at least one of the foregoing.

Embodiment 4

The coextruded multilayer article of any of Embodiments 1-3, wherein the second transparent thermoplastic polymer is selected from polycarbonates, polyester copolymers, a blend of polycarbonates and polyester copolymers, or a combination comprising at least one of the foregoing.

Embodiment 5

The coextruded multilayered article of Embodiment 4, wherein the second polymer comprises Bisphenol-A polycarbonate, copolymers of Bisphenol-A polycarbonate, or a combination comprising at least one of the foregoing.

Embodiment 6

The coextruded multilayer article of any of Embodiments 1-5, further comprising a third layer that comprises a third thermoplastic polymer having a third stress optical coefficient ($C_{m3}$) measured at 20° C. above the glass transition temperature of the third polymer; wherein the second layer is located between the first layer and the third layer; wherein a relation between the third stress optical coefficient and the second stress optical coefficient is Formula (B) $C_{m2} > 4(C_{m3})$ (Formula B).

Embodiment 7

A multilayered thermoplastic article, comprising: a first layer with a first side and a second side and with a first surface texture in a first surface on the first side, wherein the first layer comprises an acrylic thermoplastic polymer; a second layer located adjacent the second side and comprising a thermoplastic composition having BPA polycarbonate as a major component; wherein the thickness of the first layer measured from the highest peaks of the first surface texture to the second side of the first layer is greater than 1.5 times Rz of the first surface texture but less than or equal to 75% of the total thickness of the article; wherein the second layer has a second layer thickness that is greater than or equal to 25% of the total thickness of the article; and wherein an optical retardation of the article is less than 150 nm.

Embodiment 8

The coextruded multilayer article of Embodiment 7, further comprising a third layer that comprises an acrylic thermoplastic polymer.

Embodiment 9

The coextruded multilayer article of Embodiment 7, wherein the third layer comprises a second surface texture on an outermost side that is away from the second layer.

Embodiment 10

The coextruded multilayer article of any of Embodiments 1-9, wherein the total optical retardation of the article is less than or equal to 80 nm.

Embodiment 11

The coextruded multilayer article of any of Embodiments 1-10, wherein the total optical retardation of the article is less than or equal to 50 nm.

Embodiment 12

The coextruded multilayer article of any of Embodiments 1-11, wherein the total optical retardation of the article is less than or equal to 20 nm.

Embodiment 13

The coextruded multilayer article of any of Embodiments 1-12, wherein the first surface texture comprises protruded additive particles at least partially embedded the first layer.

Embodiment 14

The coextruded multilayer article of any of Embodiments 1-13, comprising an optical haze of greater than or equal to 30% as measured according to ASTM D1003-00, Procedure A, with D65 illuminant and 10 degree observer angle, on a 1 mm thick sample.

Embodiment 15

The coextruded multilayer article of any of Embodiments 1-14, wherein the surface on the first side of the first layer is an outermost surface of the article.

Embodiment 16

The coextruded multilayer article of any of Embodiments 1-15, comprising no layers adjacent to the first surface of the first layer.

Embodiment 17

The coextruded multilayer article of any of Embodiments 1-16, comprising no non-thermoplastic layer.

Embodiment 18

The coextruded multilayer article of any of Embodiments 1-17, wherein the first surface texture comprises a plurality of microstructures comprising at least one of microlenses, prisms, lenticular, or randomized peaks and valleys, and combinations comprising at least one of the foregoing.

Embodiment 19

The coextruded multilayer article of Embodiment 18, wherein the average aspect ratio of the microstructure is greater than 0.05.

Embodiment 20

The coextruded multilayer article of any of Embodiments 1-19, wherein the first texture has average roughness Ra of less than or equal to 1.2 micrometers, and wherein the optical retardation of the article is less than or equal to 15 nm.

Embodiment 21

A multilayer reflective polarizer comprising a reflective polarizing film as core film and a multilayered film of any of Embodiments 1-20 adjacent to the core film

Embodiment 22

A method of forming the coextruded multilayer article of any of Embodiments 1-20, comprising: coextruding the first and the second layer; cooling the layers between two calendering rollers; wherein at least one of the rollers comprises a textured surface to impart a surface texture to at least the first layer.

Embodiment 23

A method of forming a coextruded multilayer article comprising: coextruding a plurality of layers comprising a first layer and second layer; wherein the first layer has a first stress optical coefficient, the second layer has a second stress optical coefficient, and the first stress optical coefficient is at least 4 times smaller than the second stress optical coefficient; cooling the layers between two hard rollers; wherein one of the rollers comprises a textured surface to impart a first surface texture to the first layer; wherein the thickness of the first layer measured from the highest peaks of the first surface texture to the other side of the first layer is between 1.5 times Rz of the first surface texture and 75% of the total thickness of the article; and wherein the total optical retardation of the article is less than 150 nm.

Embodiment 24

The method of any of Embodiments 22-23, wherein the calendering rolls are two rollers with no compliant outer surface.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A coextruded multilayered thermoplastic article, comprising:
    a first layer with a first side and a second side and with a first surface texture on the first side, wherein the first layer comprises a first transparent thermoplastic polymer having a first stress optical coefficient ($C_{m1}$) measured at 20° C. above the glass transition temperature of the first polymer;
    a second layer located adjacent the second side and comprising a second transparent thermoplastic polymer having a second stress optical coefficient ($C_{m2}$) measured at 20° C. above the glass transition temperature of the second matrix;
    wherein a relation between the first stress optical coefficient and the second stress optical coefficient is Formula (A)

$$C_{m2} > 4(C_{m1}) \quad \text{(Formula A)}$$

wherein the thickness of the first layer measured from the highest peaks of the first surface texture to the second side of the first layer is greater than 1.5 times Rz of the first surface texture but less than or equal to 75% of the total thickness of the article;
    wherein the second layer has a second layer thickness that is greater than or equal to 25% of the total thickness of the article; and
    wherein the optical retardation of the article is less than or equal to 150 nm.

2. The coextruded multilayer article of claim 1, wherein Rz of the first surface texture is greater or equal to 5 micrometers.

3. The coextruded multilayered article of claim 1, wherein the first transparent thermoplastic polymer is selected from a polymer of methyl methacrylate (PMMA) with or without comonomers, cyclic olefin copolymers; polyester copolymers with inherent low birefringence, or a blend of a styrene acrylonitrile copolymer and a PMMA with or without comonomers, or a combination comprising at least one of the foregoing.

4. The coextruded multilayered article of claim 1, wherein the second transparent thermoplastic polymer is selected from polycarbonates, polyester copolymers, a blend of polycarbonates and polyester copolymers, or a combination comprising at least one of the foregoing.

5. The coextruded multilayered article of claim 4, wherein the second polymer comprises Bisphenol-A polycarbonate, copolymers of Bisphenol-A polycarbonate, or a combination comprising at least one of the foregoing.

6. The coextruded multilayered article of claim 1, further comprising a third layer that comprises a third transparent thermoplastic polymer having a third stress optical coefficient ($C_{m3}$) measured at 20° C. above the glass transition temperature of the third matrix;
    wherein the second layer is located between the first layer and the third layer;
    wherein a relation between the third stress optical coefficient and the second stress optical coefficient is Formula (B)

$$C_{m2} > 4(C_{m3}) \quad \text{(Formula B).}$$

7. The coextruded multilayered article of claim 6, wherein the third layer comprises a second surface texture on an outermost side that is away from the second layer.

8. The coextruded multilayered article of claim 1, wherein the total optical retardation of the article is less than or equal to 80 nm.

9. The coextruded multilayered article of claim 1, wherein the total optical retardation of the article is less than or equal to 20 nm.

10. The coextruded multilayered article of claim 1, wherein the first surface texture comprises protruded additive particles at least partially embedded the first layer.

11. The coextruded multilayered article of claim 1, comprising an optical haze of greater than or equal to 30% as measured according to ASTM D1003-00, Procedure A, with D65 illuminant and 10 degree observer angle, on a 1 mm thick sample.

12. The coextruded multilayered article of claim 1, wherein the surface on the first side of the first layer is an outermost surface of the article.

13. The coextruded multilayered article of claim 1, comprising no layers adjacent to the first surface of the first layer.

14. The coextruded multilayered article of claim 1, comprising no non-thermoplastic layer.

15. The coextruded multilayered article of claim 1, wherein the first surface texture comprises a plurality of microstructures comprising at least one of microlenses, prisms, lenticular, or randomized peaks and valleys, and combinations comprising at least one of the foregoing.

16. The coextruded multilayered article of claim 15, wherein the average aspect ratio of the microstructure is greater than 0.05.

17. The coextruded multilayered article of claim 1, wherein the first surface texture has average roughness Ra of less than or equal to 1.2 micrometers, and wherein the optical retardation of the article is less than or equal to 15 nm.

18. A multilayer reflective polarizer comprising a reflective polarizing film as core film and a multilayered film of claim 1 adjacent to the core film.

19. A method of forming the coextruded multilayered article of claim 1, comprising:
    coextruding the first and the second layer;
    cooling the layers between two calendering rollers;
    wherein at least one of the rollers comprises a textured surface to impart a surface texture to at least the first layer.

20. The method of claim 19, wherein the calendering rolls are two rollers with no compliant outer surface.

\* \* \* \* \*